F. P. McCOLL.
OIL FEEDING MACHINE.
APPLICATION FILED SEPT. 15, 1910.
1,206,875.
Patented Dec. 5, 1916.
5 SHEETS—SHEET 1.
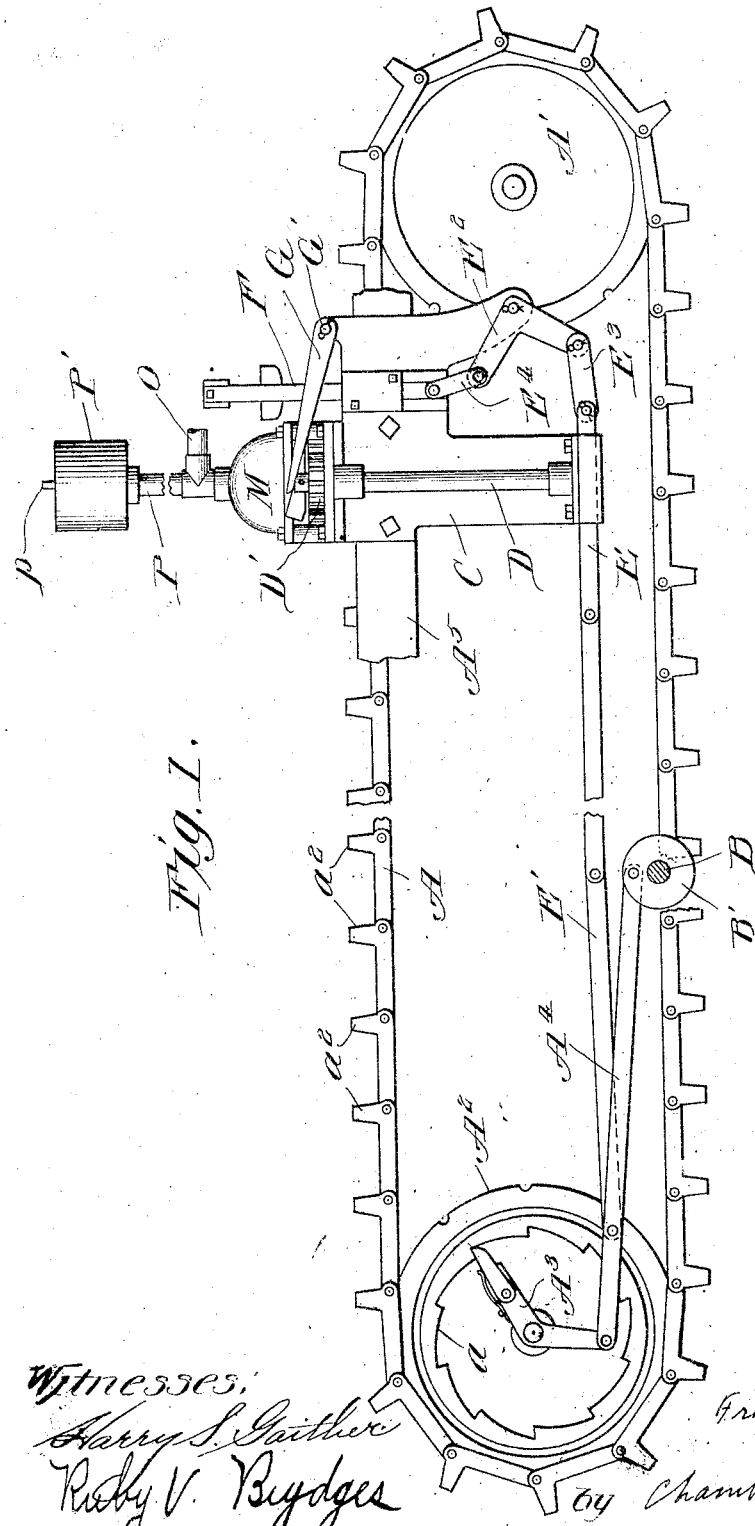

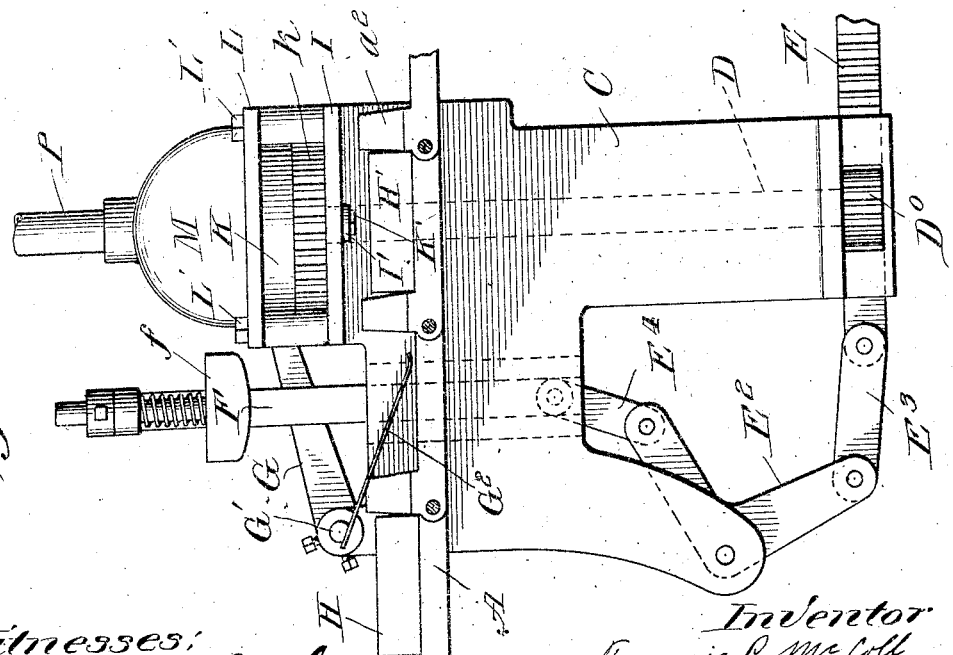

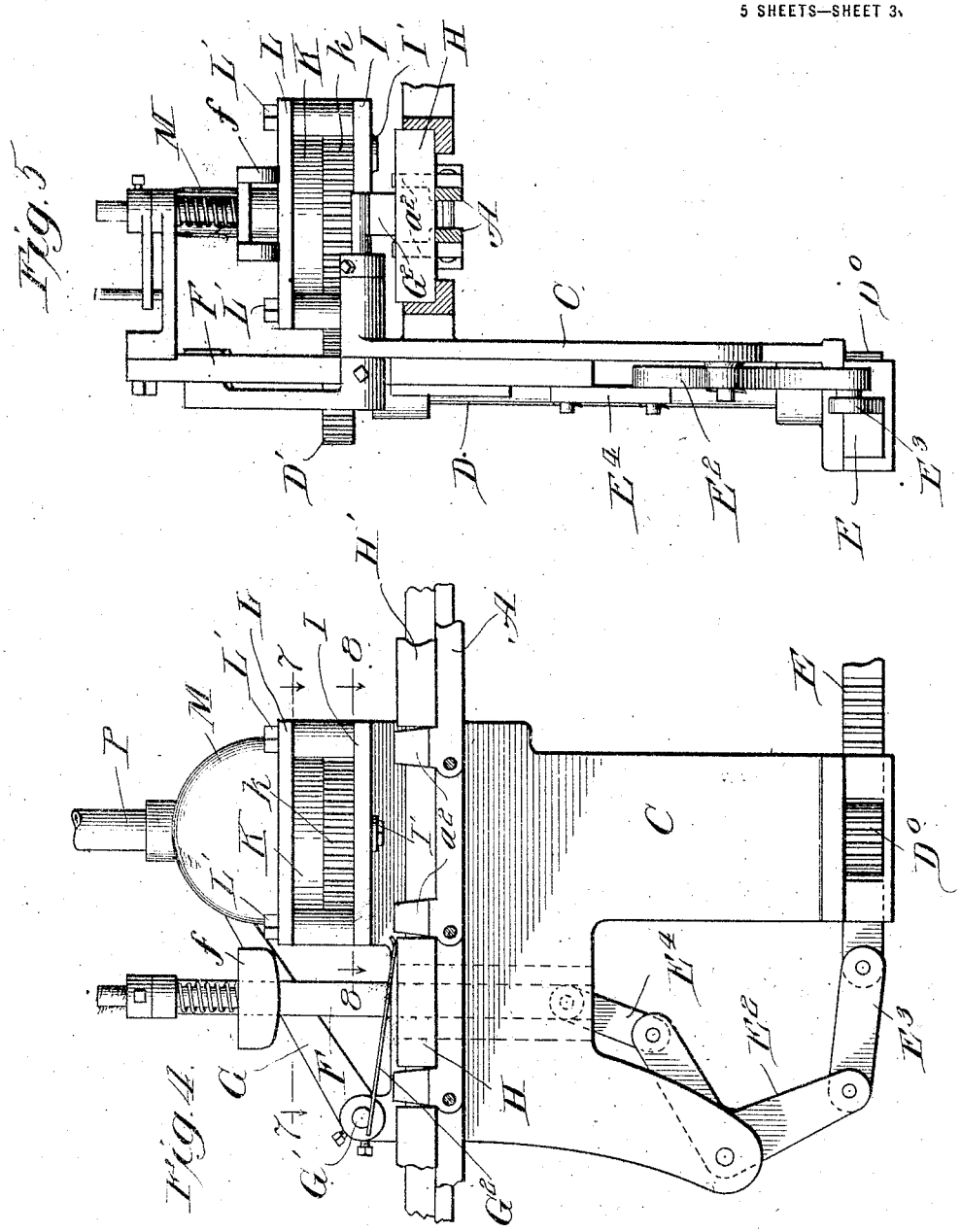

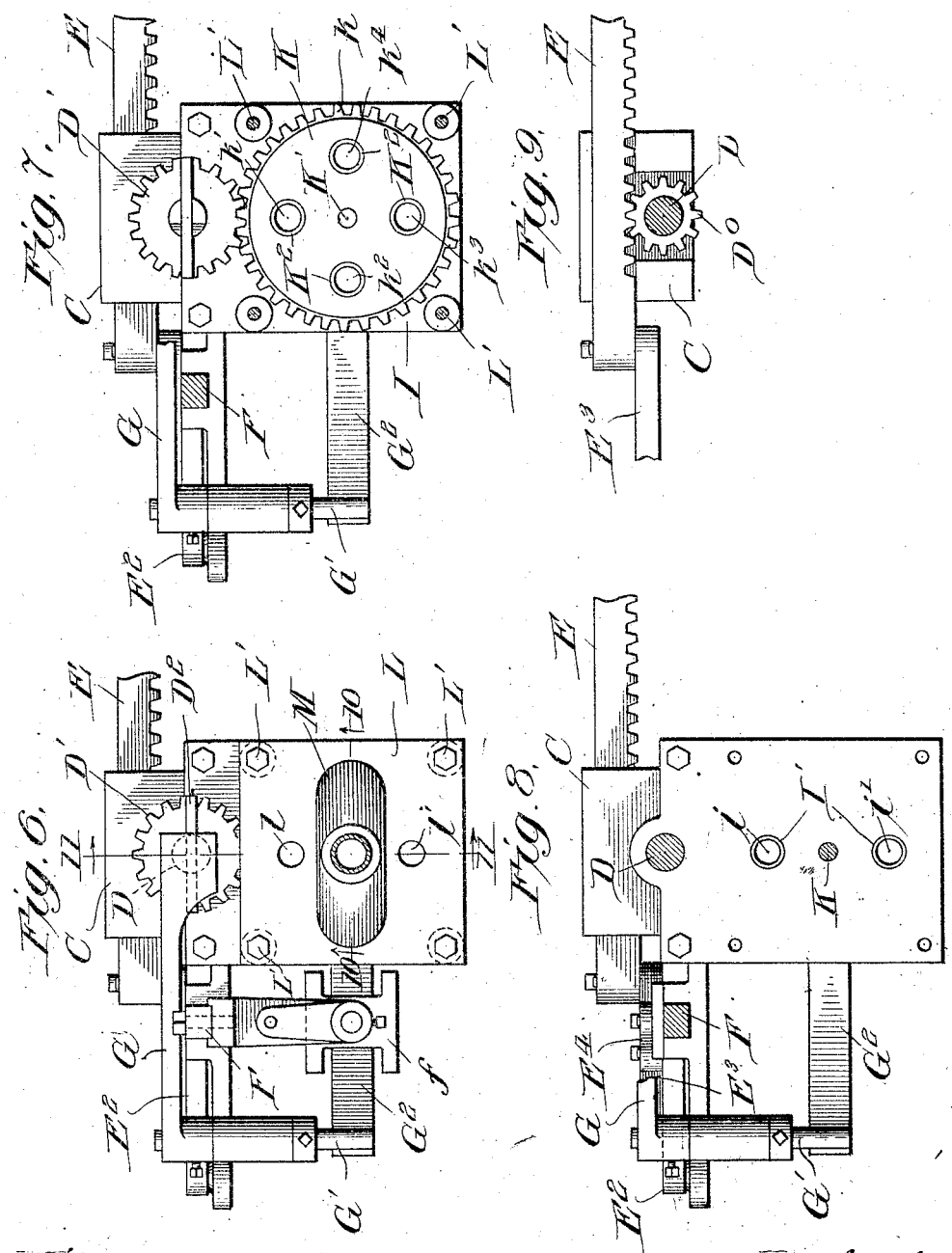

F. P. McCOLL.
OIL FEEDING MACHINE.
APPLICATION FILED SEPT. 15, 1910.

1,206,875.

Patented Dec. 5, 1916.
5 SHEETS—SHEET 5.

Witnesses:
Harry S. Gaither
Ruby V. Brydges

Inventor
Francis P. McColl,
by Chamberlin & Freudenreich
attys

UNITED STATES PATENT OFFICE.

FRANCIS P. McCOLL, OF ST. ANDREWS, NEW BRUNSWICK, CANADA, ASSIGNOR TO AMERICAN KEY CAN COMPANY, OF CHICAGO, ILLINOIS, A CORPORATION OF NEW JERSEY.

OIL-FEEDING MACHINE.

1,206,875.  Specification of Letters Patent.  Patented Dec. 5, 1916.

Application filed September 15, 1910. Serial No. 582,174.

*To all whom it may concern:*

Be it known that I, FRANCIS P. McCOLL, a citizen of the United States, residing at St. Andrews, New Brunswick, Dominion of Canada, have invented a certain new and useful Improvement in Oil-Feeding Machines, and declare the following to be a full, clear, and exact description of the same, such as will enable others skilled in the art to which it pertains to make and use the same, reference being had to the accompanying drawings, which form a part of this specification.

Various food products, of which fish may be cited as an example, are packaged in oil and, in order to secure uniformity in the product as well as economy in the process of packing, it is necessary that the oil be introduced in measured quantities and by machinery.

My invention, specifically considered, relates to the art of introducing oil in packages containing food products, and has for its object to provide simple and reliable machinery which shall supply the oil automatically in measured quantities and which will prevent waste or scattering of oil in the vicinity of the machinery.

A further object of my invention is to provide an automatic oiling apparatus adapted to be used in conjunction with a can carrier of any suitable construction, and so arranged that it will feed only when there is a can present to receive a supply of oil.

Figure 10:
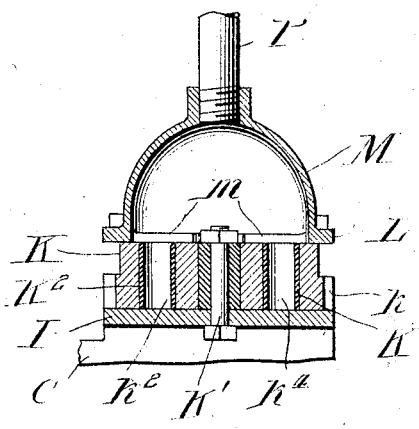
Figure 11:
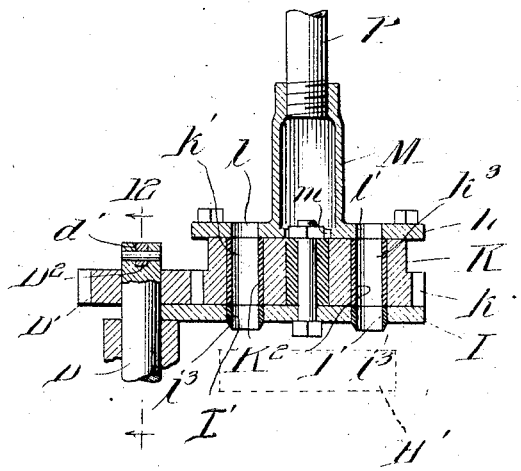
Figure 12:
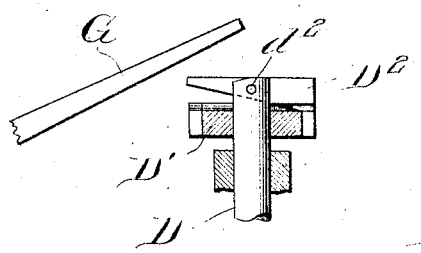
Figure 13:
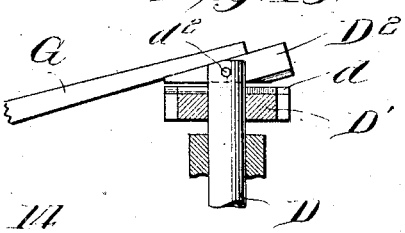
Figure 14:
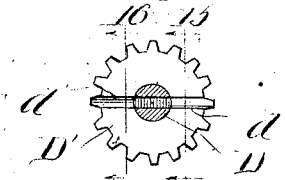
Figure 15:
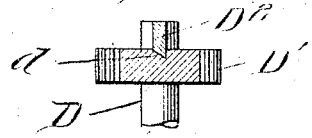
Figure 16:

The various features of novelty whereby my invention is characterized will hereinafter be pointed out with particularity in the claims; but for a full understanding of my invention and of its objects, including those enumerated and others, reference may be had to the following detailed description taken in connection with the accompanying drawings, wherein:

Figure 1 is a side elevation of a machine arranged in accordance with a preferred form of my invention, showing its relation to a suitable can carrier; Fig. 2 is a view on an enlarged scale showing the opposite side of the oiling mechanism from that which appears in Fig. 1; Figs. 3 and 4 are views similar to Fig. 2 showing, however, different positions of the parts; Fig. 5 is a view looking toward the right in Fig. 4; Fig. 6 is a plan view looking down on Fig. 4; Fig. 7 is a section taken on line 7—7 of Fig. 4; Fig. 8 is a section taken on line 8—8 of Fig. 4; Fig. 9 is a detail of the driving connection for the oiling device; Fig. 10 is a section on line 10—10 of Fig. 6; Fig. 11 is a section on line 11—11 of Fig. 6; Figs. 12 and 13 are sections on line 12 of Fig. 11, showing different positions of the parts; Fig. 14 is a view looking down on Fig. 13, the controlling arm being omitted; and Figs. 15 and 16 are respectively sections on line 15—15 and line 16—16 of Fig. 14.

Referring first to Fig. 1 of the drawings: A represents a suitable can carrier, illustrated in the form of an endless chain or belt which passes over wheels or pulleys A' and A². The member A² is provided with an internal ratchet wheel having teeth $a$ whose angular length corresponds with the angular length of one of the links of the chain as it is passing around the wheel or pulley.

A³ is a pawl coöperating with the teeth $a$ and adapted to turn the driving wheel step by step and thus move the can carrier forward intermittently. A connecting rod A⁴ connects the pawl to a crank disk B' carried upon a rotating driving shaft B. The driving shaft B is intended to be continuously driven so as to oscillate the pawl in regular periods. The carrier is provided with upwardly projecting fingers $a^2$ between which are adapted to rest the cans which are to be filled with oil. All these parts have simply been illustrated conventionally since they may take any usual or preferred forms. Adjacent to the carrier is a frame C which may either be an attachment to or form part of the main frame A⁵.

D is a vertical shaft mounted upon the member C and connected to the driving mechanism in such a way as to have an oscillatory movement through an angle of 180 degrees. In the arrangement shown the shaft is provided with a driving pinion D⁶ (see Fig. 9) at its lower end and meshing with a rack bar E which is in turn connected to the connecting rod A⁴ by an auxiliary connecting rod E'. As the main driving shaft rotates, the can carrier is moved forward step by step, remaining at rest after each step, and the main shaft of the oiling mechanism is oscillated through an arc of 180 degrees.

The free end of the rack bar is connected to a bell crank lever E² by a link E³, and the bell crank is in turn connected to a vertically movable plunger F by means of a link E⁴. It will thus be seen that the plunger is reciprocated in synchronism with the driving shaft of the oiling device and with the step by step movement of the can carrier.

Upon the upper end of the oscillating shaft D is loosely mounted a pinion D' which is adapted to be clutched to and unclutched from the shaft so as to cause the oiling apparatus to be active or to remain idle as the condition of the work may require. The details of this clutch are best shown in Figs. 11 to 16. The pinion D' is provided in its upper surface with a ratchet slot d extending diametrically across the same. The upper end of the shaft is slotted as at d to receive a pawl D², the pawl being pivotally mounted between its ends as at d². Normally, when the pawl is left free, its nose drops into the ratchet slot d when the slot comes in the plane of movement of the pawl. When this occurs, the pinion moves with the shaft until it has been turned 180 degrees but, when the shaft starts on its return movement, the pawl rides out of the slot and does not drop in place again until the pinion has reached the other limit of its movement. In this way, particularly where there is some resistance to the movement of the pinion, the pinion will be turned step by step through angles of 180 degrees, traveling with the shaft in one direction and remaining idle while the shaft returns to the opposite end of its movement. The pawl is controlled by an arm G carried upon one end of a rock shaft G' revolubly supported in the frame C so as to extend across the top of the can carrier. Normally the weight of the arm G is sufficient to permit it to drop as indicated in Figs. 1 and 13 and, engaging with the pawl, lift it out of operative relation with the pinion.

As most clearly shown in Figs. 2 to 8, the rock shaft G' carries a finger G² directly above the can carrier and in position to be engaged by a can in the carrier. In Fig. 2, one compartment of the carrier is shown empty so that the finger and consequently the arm G are free to drop, thereby unclutching the pinion from its driving shaft. Consequently as the carrier is fed forward one step, the pinion remaining stationary and the oil feeding apparatus, as will hereinafter be described, remains inactive. In Fig. 3 the parts are shown in the positions which they occupy after the carrier has moved one step forward from the position indicated in Fig. 2. It will be seen that the can H in the carrier has moved under the finger G² and has lifted it, thereby raising the arm G and permitting the clutch to become operative. The parts are now in the positions which they occupy just as the oscillating shaft starts its return movement so that the pinion remains stationary until the end of the return movement of the oscillating shaft is reached. It will be seen that as the carrier moves from the position indicated in Fig. 2 to that indicated in Fig. 3, the plunger F descends until the fork-shaped head f straddles the finger G² and enters the top of the can. It will thus be seen that just as the can comes to rest the head of the plunger enters the can and presses the contents slightly below the top edges, so that when the can reaches the oil feeder the contents of the can do not project above the top thereof and consequently there is no danger of the oil overflowing if it is supplied in proper quantities.

In Fig. 4 the parts are illustrated in the positions which they occupy during the idle portion of the stroke of the driving mechanism. The plunger F having been carried to the upper limit of its movement and the oscillating shaft having been brought into the position wherein the pinion is clutched thereto. The carrier now begins to travel until the can H is brought into the position occupied by the can H' in Fig. 2 and the plunger again descends until it enters the next succeeding can H², after which the carrier comes to rest. It will be seen that whenever a can passes under the finger G² it throws in the clutch of the oiling device so that the oiling device is actuated during the time the can is passing from the position occupied by the can H in Fig. 3 to that occupied by the can H' in Fig. 2. On the other hand if there is no can in the compartment of the carrier which passes beneath the finger G², the clutch of the oiling device remains out so that the oiling device remains idle during the succeeding step of movement of the carrier.

The oiling device is best illustrated in Figs. 4 to 11. By referring to Fig. 7 it will be seen that there is a plate I extending horizontally above the carrier from the frame C directly in advance of the finger G² and the plunger F. This plate is provided with two holes, i and i' which are spaced apart a distance somewhat less than the length of a can to which oil is to be supplied. Resting upon the plate I is a disk K having gear teeth k about its periphery. The disk is journaled upon the plate I midway between the openings i and i' as at K' and is provided with four holes k' to k⁴ which are spaced angularly 90 degrees apart and at the same distance from the axis of the disk as the openings i and i'. The teeth on the disk mesh with the teeth on the pinion D' so that whenever the pinion rotates, the disk rotates with it and when the pinion is idle the disk also remains stationary. The parts are so proportioned that the pinion makes two revolutions for each revolution of the disk and consequently whenever the pinion is moved half way around, in the manner I have heretofore described, the disk is moved through an angle of 90 degress. The parts are so adjusted that two of the openings in the disk, for example the openings $k'$ and $k^3$ register with the openings $i$ and $i'$ when the pinion occupies a position wherein the pawl drops into clutching engagement therewith when free to do so. During the return movement of the oscillating shaft, the pinion and disk remain stationary. On the succeeding working stroke of the oscillating shaft the disk is again turned through an angle of 90 degrees so as to bring the openings $k^2$ and $k^4$ into registration with the openings $i'$ and $i$, respectively. Thus it will be seen that whenever two of the openings in the disk are brought into registration with those in the plate beneath, they remain in this position for an appreciable length of time. On top of the disk is a second stationary plate, L; this plate being secured to the plate I in any suitable manner, as by means of bolts $L'$. The plate L is provided with openings $l$ and $l'$ which are located directly above the openings $i$ and $i'$. Thus whenever the rotating disk is stationary there are two clear passages extending through the two plates and the disk between them.

M is a housing arranged above the plate L, as shown most clearly in Figs. 6, 10 and 11, and forming with the plate an oil container. The housing and the plate are preferably cast in one piece so that the plate in effect constitutes a flange about the lower end of the housing. The housing is made long and narrow and lies between the openings $l$ and $l'$ with its long axis at right angles to the line connecting these openings. The housing is open at the bottom as indicated at $m$. The length of the housing is such that its open bottom registers with the two openings in the disk which lie between the openings $i$ and $i'$. The parts are all finished so that the disk has a good bearing surface on the upper side of the lower plate and on the underside of the upper plate. It will be seen that whenever two of the openings in the disk lie directly beneath the bottom of the oil container, oil will flow from the container into such openings and will fill them. Then when the disk is rotated through an angle of 90 degrees the full openings will be brought into registration with the openings in the lower plate and the oil will flow through these latter openings and descend into a can lying beneath them. Thus the openings in the disk constitute measuring chambers for receiving oil and carrying it from the main reservoir or container to the discharge points. It will be seen that whenever one set of measuring chambers is discharging its contents, the other set is in a position to receive a fresh charge of oil.

The openings $l$ and $l'$ place the measuring chambers in communication with atmosphere at the time they are discharging their contents so that the oil will flow freely therefrom and none will be retained in the chambers due to the formation of a partial vacuum. At the time the chambers are receiving their supply of oil from the container, the air therein is free to pass up into the container so that each chamber will receive a full charge of oil whenever it is brought beneath the container. Thus by properly proportioning the openings in the disk, the oil may be measured out accurately in any desired quantities and delivered to a weighing can without waste and without loss in quantity. The openings in the disk may be provided with detachable bushings as indicated at $K^2$ so that by having bushings of several sizes, the same apparatus will serve to deliver oil in any quantity desired. I also prefer to place bushings in the openings $i$ and $i'$ as indicated at $l'$, these bushings being longer than the thickness of the plate and having their depending ends chamfered as indicated at $l^3$, thus giving a sharp edge to the outlet for the oil and preventing any considerable quantity from clinging in place.

With this description of the construction and operation of the oiling apparatus, it will readily be understood how the apparatus works in conjunction with the mechanism heretofore explained. Thus the can H' in Fig. 2, in moving into this position has thrown in the clutch for driving the disk of the feeding device so that as it begins to pass under the openings $i$ and $i'$ the oil starts to flow through these openings from the chambers which may be assumed to be the chambers $k'$ and $k^3$. The carrier and the can remain stationary while the oscillating driving shaft is on its return stroke so that plenty of time is allowed for all of the oil to drip into the can. The clutch remains out of engagement until another can, the can H, rides under the finger $G^2$ as indicated in Fig. 3 so that when the empty gap between the cans H' and H comes under the oil openings there will be no discharge of oil. When the can H reaches the position indicated in Fig. 3, it throws in the clutch so that when the parts have reached the positions indicated in Fig. 4, the can begins to move toward the oil supply openings and the disk begins to turn so as to bring the filled oil chambers $k^2$ and $k^4$ over the discharge openings and the empty chambers $k'$ and $k^3$ beneath the outlets in the container. Just before the can H comes to rest under the discharge openings, the oil begins to flow through these openings and then sufficient time is given for all the oil to drip from the chambers before the can again begins to travel.

The oil may be supplied to the container through a pipe O which leads to a reservoir common to any desired number of oil feeding machines, there being thus a constant supply of oil. Some means must be provided for getting rid of the air which is contained in the measuring chambers when they come under the container and this may readily be accomplished by providing the container with a stand pipe P high enough to prevent the head of oil in the supply pipe from causing the oil to overflow at the top of the stand pipe. I prefer to enlarge the upper end of the stand pipe, preferably making a large chamber, P', at this point and providing a suitable vent p. In this way the bubbles of air going up through the stand pipe leave the oil level in the chamber and burst so that the films of oil which are carried thereby are shattered and scattered over the interior of the chamber, and only the pure air flows out of the vent. Where the pipe itself is left open, without providing the enlargement of the top, considerable oil passes off with the air and is scattered in the vicinity of the machine, covering everything including the operators with a coat of oil.

While I have illustrated and described with particularity only a single form of my invention I do not desire to be limited to the specific details so illustrated and described; but intend covering all constructions and arrangements which fall within the terms employed in the definitions of my invention constituting the appended claims.

What I claim is:

1. In an oil feeding apparatus, two parallel horizontal plates, a disk fitting between and revolubly supported on said plates, said disk having an open-ended chamber therein, said plates having openings therein in position to register with said chamber in one angular position of said disk, a housing arranged above the upper plate and forming therewith an oil container, the upper plate having a second opening therethrough below said housing in position to register with said chamber in a second angular position of said disk, said disk having gear teeth about its periphery, and a driving pinion meshing with said teeth for actuating the disk.

2. In an oil feeding apparatus, two parallel horizontal plates, a disk fitting between and revolubly supported on said plates, said disk having four openings therethrough forming oil-measuring chambers, said chambers being arranged ninety degrees apart, each of said plates having two openings therein which are adapted to register with one set of diametrically opposed chambers in one angular position of said disk and with the other set of chambers in a second position of the disk, a housing arranged above the upper plate between the openings therein and forming with the plate an oil container, the upper plate having oil outlets therethrough at points beneath the housing which are so located that the outlets register with one of said sets of chambers when the other set registers with the aforesaid openings in the plates, and means for rotating said disk.

3. In combination, a can carrier, an oil feeding device arranged adjacent to the carrier, means for moving said carrier step by step to bring cans therein successively into operative receiving position relative to said device and hold them stationary for a short time in such position, actuating means for said device working in synchronism with said carrier, a clutch between said device and said actuating mechanism, and means in the path of a can in the carrier one step removed from the receiving position for controlling said clutch.

4. In an oil feeding apparatus, a can carrier, actuating means for said carrier, an oil feeding apparatus arranged to deliver oil to a can in said carrier, said oil feeding apparatus including a driven gear and a driving pinion, a clutch between said pinion and said actuating means, and a clutch-actuating member lying in the path of movement of said can.

5. In combination, a can carrier, an oil feeding device arranged adjacent to said carrier, means for moving said carrier step by step to bring cans therein successively into operative receiving positions relative to said device and holding them stationary for a short time in such positions, a plunger arranged to be moved into a can in the carrier prior to the time the can moves into the oil receiving position, and means moving in synchronism with said carrier for controlling said oil feeding device and actuating said plunger.

In testimony whereof, I sign this specification in the presence of two witnesses.

FRANCIS P. McCOLL.

Witnesses:
JESSIE M. PEABODY,
F. T. ELDRIDGE.